United States Patent [19]

Taira

[11] 4,397,529

[45] Aug. 9, 1983

[54] ILLUMINATION SYSTEM FOR MICROSCOPES

[75] Inventor: Akio Taira, Hachiouji, Japan

[73] Assignee: Olympus Optical Co., Ltd., Tokyo, Japan

[21] Appl. No.: 251,542

[22] Filed: Apr. 6, 1981

[30] Foreign Application Priority Data

Apr. 7, 1980 [JP] Japan ................................ 55/45390

[51] Int. Cl.³ ............................................. G02B 21/08
[52] U.S. Cl. ...................................... 350/526; 350/572
[58] Field of Search ....................... 350/38, 39, 45, 54, 350/85, 87, 88, 89, 475, 526

[56] References Cited

U.S. PATENT DOCUMENTS

| | | | |
|---|---|---|---|
| 1,236,722 | 8/1917 | Lange | 350/45 X |
| 2,541,014 | 2/1951 | Orser | 350/475 |
| 2,997,916 | 8/1961 | Friedman et al. | 350/54 X |
| 3,137,761 | 6/1964 | Conradi et al. | |
| 3,484,148 | 12/1969 | Gotoh | 350/54 X |
| 3,679,287 | 7/1972 | Takahashi et al. | 350/87 |
| 4,063,797 | 12/1977 | Taira | 350/87 |

*Primary Examiner*—John K. Corbin
*Assistant Examiner*—Matthew W. Koren
*Attorney, Agent, or Firm*—Cushman, Darby & Cushman

[57] ABSTRACT

An illumination system for microscopes which composes an illumination system for microscopy at high magnification level of a light source, a collector lens, a field stop, an aperture stop, a relay lens system for high magnification level and a condenser lens, and composes an illumination system for microscopy at low magnification level by using a relay lens system for low magnification level in place of said relay lens system for high magnification level and said condenser lens employed for composing the illumination system for microscopy at the high magnification level. Said illumination system is so adapted as to provide favorable illumination within a wide magnification range from 1× to 100×.

13 Claims, 21 Drawing Figures

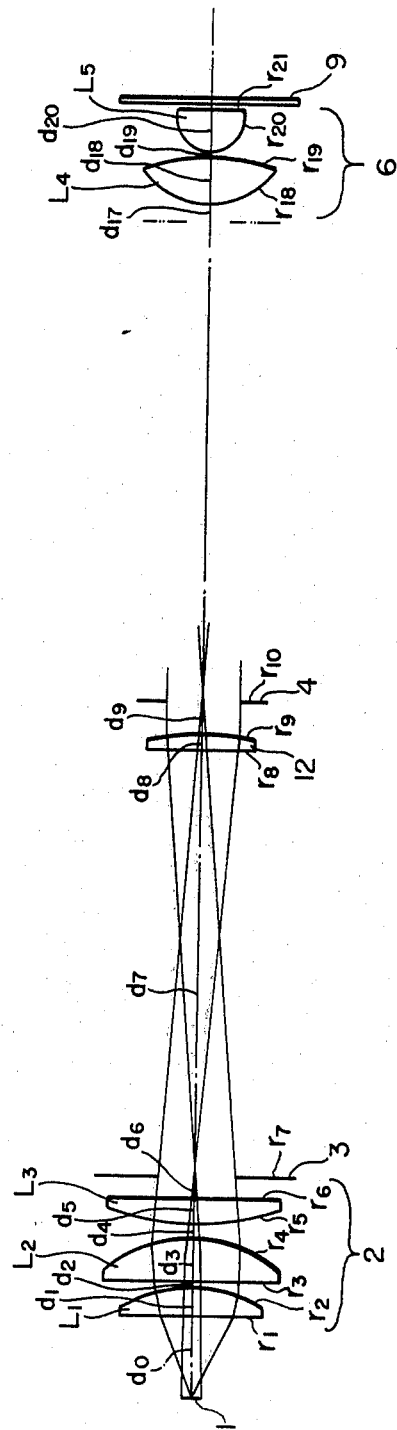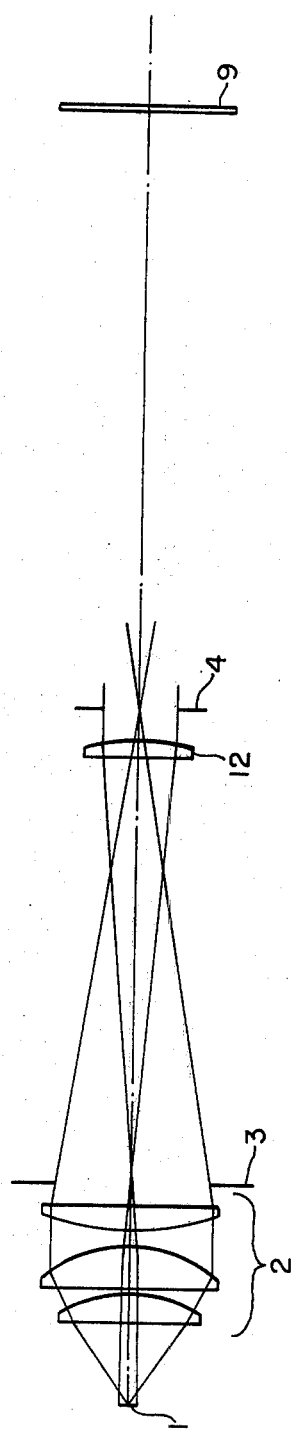

ILLUMINATION SYSTEM FOR MICROSCOPES

BACKGROUND OF THE INVENTION (a) Field of the Invention

The present invention relates to a transmission type of illumination system for microscopes and, more specifically to a transmission type of illumination system for microscopes which composes a complete Köhler illumination system within a wide magnification range from 1× to 100×.

(b) Description of the Prior Art:

An ideal illumination system for microscopes should satisfy four requirements: (1) being free from ununiform illumination, (2) having N.A. satisfying N.A. of the objective lens to be used in combination therewith, (3) allowing field stop to be effective and (4) allowing aperture stop to be effective. Köhler illumination system is known as an illumination system satisfying these requirements. It can satisfy these requirements by so designing it as to form an image of a light source having a size large enough to satisfy N.A. of the objective lens at the position of the aperture stop, project it to the pupil plane of the objective lens and, on the other hand, form an image of field stop at the plane of object to be observed. However, since a microscope is used within a very wide magnification range from 1× to 100× between which both N.A. and size of visual field are remarkably different, it is impossible to realize an ideal Köhler illumination system at all the magnification levels with a single illumination system. For this reason, there have conventionally been invented illumination systems so adapted as to cover a wide magnification range by switching the systems at plural stages by inserting and/or removing lens(es) into and out of the optical path. Out of these illumination systems, the one disclosed by U.S. Pat. No. 3,137,761 is so adapted as to cover a magnification range from low to high levels by switching relay lenses to be used with a condenser lens employed commonly at all magnification levels. In an illumination system of this type using a condenser lens commonly at all the magnification levels, the condenser lens must have rather a long focal length for the purpose of illuminating a wide visual field at low magnification levels. However, as focal length of the condenser lens is prolonged, chromatic aberration and spherical aberration are aggravated, thereby degrading image quality undesirably at high magnification levels. Further, a prolonged focal length of the condenser lens unavoidably enlarges the illumination system as a whole. Furthermore, the illumination system of the type using the condenser lens commonly at all the magnification levels does not permit widening magnification range down to an ultra-low level, but is usable only at magnification levels down to 4× to 10×.

In addition, there have conventionally been known an illumination system covering a wide magnification range which was disclosed by Japanese published unexamined patent application No. 59951/79. This illumination system composes Köhler illumination system which can cover a magnification range from 1× to 100× by switching condenser lenses and aperture stops between high and low magnification levels, and employing the relay lens system at high or low magnification level. However, this conventional examples requires a very complicated switching mechanism since the relay lens system must be inserted and removed into and out of the optical path at a position nearer the light source than the aperture stop for low magnification level is. This is due to the fact that the illumination system has an optical system folded as shown in FIG. 1 and a portion of the optical system is arranged inside a microscope stand. Further, since the relay lens R is used on the side of the light source, it is located on the optical axis inside the microscope stand. On the other hand, since the condenser lens for high magnification level H and the condenser lens for low magnification level L are located on the object side, certain optical elements must be displaced in the vertical direction indicated by the arrow A, whereas other optical elements must be displaced in the horizontal direction indicated by the arrow B shown in FIG. 1.

Though the conventional illumination systems are so designed as to be switchable at two stages of high and low magnification levels, another problem is posed when a single illumination system is used commonly in a wide magnification range. Let us assume, for example, a case where a magnification range from 10× to 100× is covered by an illumination system and a magnification range of 1× to 10× is covered by another illumination system switched from said illumination system. When an image of the light source is formed so as to satisfy N.A. of the objective lens at a magnification level of 100×, only a portion of the light source image is usable at 10× at which N.A. is smaller. When N.A. is 1.3 at 100× and 0.25 at 10×, for example, only 1/5 (=0.25/1.3) of the light source image is usable at 10×. As a result, only a portion of the filament of the illumination light source is used for illumination, thereby making illumination ununiform due to influence caused by cubic structure of the filament, etc. A simple method to prevent such ununiform illumination is to minimize the light source image to a certain degree so as not to satisfy N.A. at 100× for preventing ununiform illumination at 10×, and to use a diffusion plate to cover the large N.A. at 100×. However, this method reduces illumination light intensity at 100× and makes it impossible to observe the light source image directly, thereby making optical alignment rather difficult, degrading image contrast and bringing about other various undesirable or inconvenient results.

SUMMARY OF THE INVENTION

A general object of the present invention is to provide an illumination system for microscopes so adapted as to be usable within a wide magnification range from 1× to 100× by employing a condenser lens and relay lens system for high magnification level when it is set for microscopy at high magnification level, or employing a relay lens system for low magnification level in place of said lenses when it is set for microscopy at low magnification level.

BRIEF DESCRIPTION OF THE DRAWINGS

FIG. 3A and FIG. 3B show sectional views illustrating an optical system with the relay lenses excepted as a preferred embodiment of the present invention;

DETAILED DESCRIPTION OF THE PREFERRED EMBODIMENT

Figure 1:
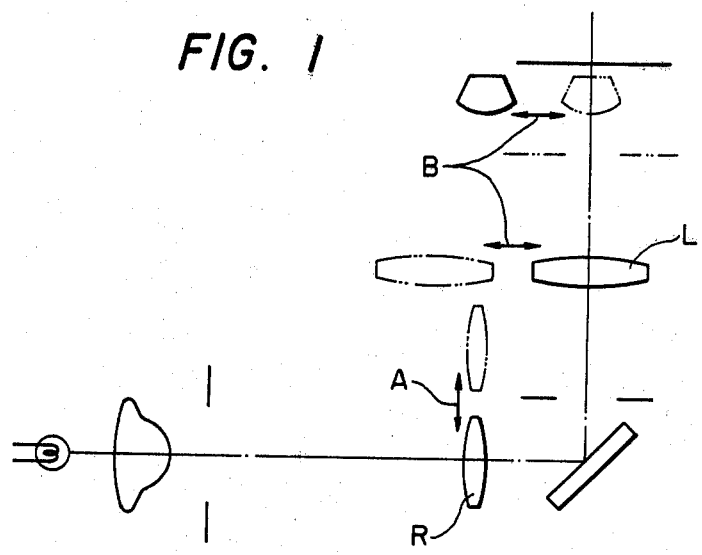
FIG. 1 shows a sectional view illustrating the composition of the conventional illumination system for microscopes.
Figure 2A:
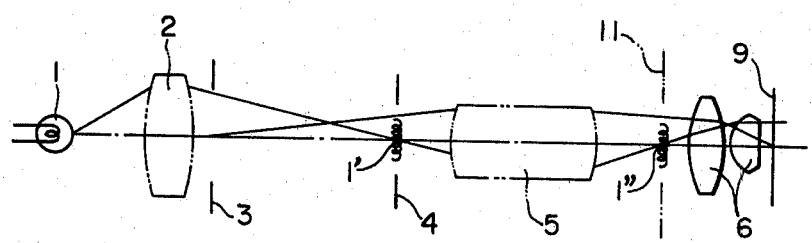
FIG. 2A and FIG. 2B show sectional views illustrating composition of the illumination system for microscopes according to the present invention.
Figure 2B:
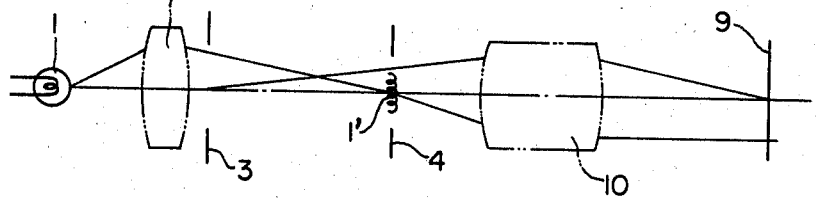

Now the illumination system according to the present invention will be described more detailedly with reference to the accompanying drawings. The fundamental composition of the optical system of the illumination system according to the present invention is shown in FIG. 2A and 2B, the former illustrating the optical system when it is set for microscopy at a high magnification level and the latter illustrating the optical system when it is set for microscopy at a low magnification level. For microscopy at a high magnification level, a light source 1, a collector lens 2, a field stop 3, an aperture stop 4, a relay lens system for high magnification level 5 and a condenser lens 6 are arranged on the optical axis consecutively as shown in FIG. 2A. An image 1' of the light source 1 is formed by the collector lens 2 in the vicinity of the aperture stop 4. The relay lens system for high magnification level 5 forms an image 1" of the image 1' in the vicinity of the front focal point of the condenser lens 6, and the image 1" is projected by the condenser lens 6 to the entrance pupil of an objective lens (not shown). Further, an image of the field stop 3 is projected by the relay lens system 5 and condenser lens 6 to an object surface 9. A Köhler illumination system is composed as described above.

When the illumination system is set for microscopy at a low magnification level, on the other hand, the light source 1, collector lens 2, field stop 3 and aperture stop 4 are arranged on the optical axis as shown in FIG. 2B so that these components are used commonly to microscopy at the high magnification level and the image 1' of the light source 1 is formed at the position of the aperture stop 4. In addition, a relay lens system for low magnification level 10 is arranged after the aperture stop 4 when the illumination system is set for microscopy at the low magnification level. This relay lens system 10 is different from the relay lens system for high magnification level 5 and is inserted into the optical path in place of the relay lens system for high magnification level 5 and the condenser lens 6 which are employed for microscopy at the high magnification level. The relay lens system for low magnification level functions to project the image 1' of the light source to the entrance pupil of the objective lens and also form an image of the field stop 3 on the object surface 9. A Köhler illumination system is composed in this way also for microscopy at the low magnification level. The condenser lens 6 is not employed for microscopy at the low magnification level.

In the illumination system according to the present invention, the light source 1, collector lens 2, field stop 3 and aperture stop 4 are kept immovable in the optical path regardless of switching of magnification levels, and the illumination system is switched between the high and low magnification levels simply by inserting and removing the relay lens systems and condenser lens only into and out of the optical path. These relay lens systems and condenser lens are arranged between the aperture stop 4 and object surface 9 in the section outside the microscope stand. The illumination system according to the present invention therefore permits switching between high and low magnification levels simply by horizontally sliding the components to be exchanged for the switching and can simplify construction of the switching mechanism as compared with those of the conventional mechanisms for performing combinations of horizontal and vertical displacements.

Further, since the illumination system according to the present invention is so composed as to form image of the light source image 1' again with the relay lens system for high magnification level 5 for microscopy at the high magnification level as is seen from FIG. 2A, it can satisfy N.A. of the objective lens both at high and low magnification levels by forming the light source image 1' of a small size for microscopy at the low magnification level and enlarging the image 1' with the relay lens system 5' for microscopy at the high magnification level at which a large image is necessary. Moreover, the light source image of such a small size allows to use the collector lens 2, field stop 3, aperture stop 4, etc. having small outside diameters, thereby making it possible to design the illumination system compact.

In addition, since the illumination system according to the present invention forms the light source image 1' in front of the relay lens system as is seen from FIG. 2A, it is advantageous for microscopy in the modes of dark field, phase-contrast, etc. Speaking concretely, a light shield plate, phase plate or the like accorssory inserted at the position of the light source image 1' is equivalent to that arranged at the pupil position of the objective lens, thereby giving high effect. Further, the illumination system according to the present invention does not require a light shield plate or phase plate inserted between the relay lens system and condenser lens, thereby facilitating insertion and removal of these accessories. Needless to say, an aperture stop 11 may be used as traced in the chain line in the drawing.

Figure 4A:
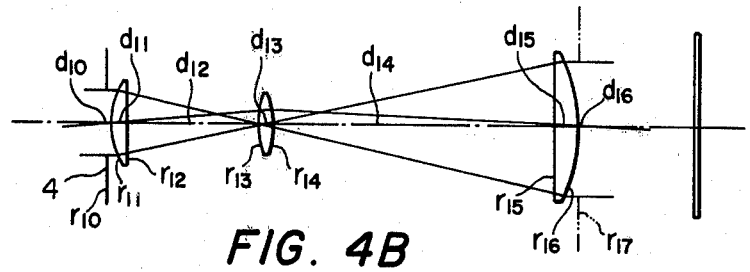
FIG. 4A and FIG. 4B show sectional views illustrating composition of the relay lens systems for high magnification levels to be used in the embodiment of the present invention.
Figure 4B:
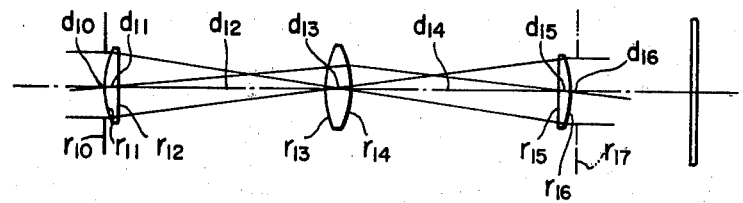
Figure 5A:
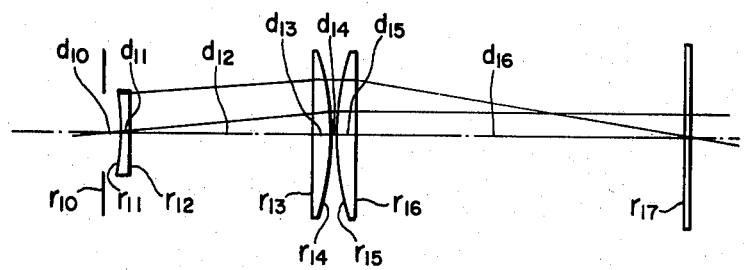
FIG. 5A and FIG. 5B show sectional views illustrating composition of the relay lens systems for low magnification levels to be used in the embodiment of the present invention.
Figure 5B:
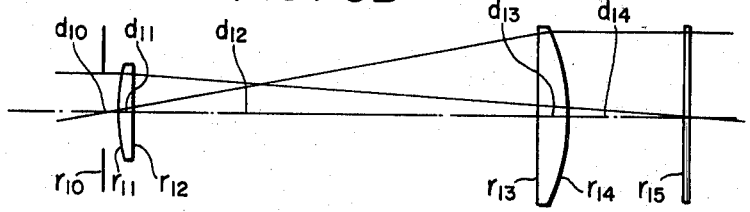

The illumination system according to the present invention permits increasing number of switching steps without deviating from its fundamental composition. This can be achieved by preparing two or more relay lens systems such as those illustrated in FIG. 4A and FIG. 4B to be used in the fundamental composition shown in FIG. 2A within the range of the high magnification level and switching these relay lens systems at narrower steps in accordance with variations in magnification levels. Speaking concretely, the relay lens system shown in FIG. 4A is to be used in combination with objective lenses having magnification levels of 100× to 40×, whereas the relay lens system shown in FIG. 4B is to be used in combination with objective lenses having magnification levels of 20× to 10×. Similarly, when relay lens systems shown in FIG. 5A and FIG. 5B are prepared for microscopy within low magnification levels, it is possible to switch them so as to cover a range of 4× to 2× with the relay lens system shown in FIG. 5A and a range of 2× to 1× with that shown in FIG. 5B. An illumination system which permits switching such multiple relay lens systems can further minimize ununiformity in illumination, thereby offering higher convenience for microscopy. Speaking more concretely, since the illumination system permits switching the relay lens systems in accordance with objective lenses so as to form the light source image 1'' of a size adequate for N.A. of the objective lenses for microscopy at the high magnification levels, it is possible to use almost all the filament area always for all the objective lenses used, thereby preventing uniform illumination. Further, since the light source image has size adequate for magnification level, almost all the area of the light source image cannot be shielded by the aperture stop, thereby assuring improved illumination effect. On the other hand, for microscopy at the low magnification levels for which size of the light source image 1' remains unchanged but no condenser lens is used, the illumination system assures illumination free from ununiformity and improved illumination efficiency by switching the relay lens systems in accordance with objective lenses.

In a case where the relay lens systems are switched at multiple stages as described above, the illumination system requires multiple relay lens systems complicated in their compositions, but the switching mechanism can have a simple construction since the illumination system can be switched simply by inserting and removing the relay lens systems only into and out of optical path.

In case of the illumination system switchable at the multiple stages, it is possible to arrange the field stop and aperture stop so as to compose a nearly ideal illumination system in combination each objective lens to be employed for microscopy, thereby eliminating the conventional necessity of fine adjustment of each stop at each switching stage and therefore simplifying operations in exchange of the objective lenses during microscopy so as to provide high convenience for observation and photographing through microscopes. Now, a preferred embodiment of the present invention will be described. In FIG. 3A and FIG. 3B, the reference numeral 1 represents a light source, the reference numeral 2 designates a collector lens consisting of three elements, the reference numeral 3 denotes a field stop, the reference numeral 4 represents an aperture stop, the reference numeral 6 designates a condenser lens consisting of two elements, the reference numeral 9 denotes a specimen surface and the reference numeral 12 represents a field lens which is so arranged as to locate its front focal point nearly coincident with the position of the field stop 3 and functions to project an image of the field stop to nearly infinite distance. Between the aperture stop 4 and the specimen surface 9, there is arranged a relay lens system consisting, for example, of three lens components (not shown in these drawings) which will be described later. The illumination system shown in FIG. 3A and FIG. 3B has the numerical data summarized in Table 1 below:

TABLE 1

| | | |
|---|---|---|
| $r_1 = \infty$ | $d_0 = 13.9$ | |
| $r_2 = -23.4$ | $d_1 = 5.0$ | $n_1 = 1.6228$ |
| | $d_2 = 0.5$ | |

TABLE 1-continued

| | | |
|---|---|---|
| $r_3 = \infty$ | $d_3 = 7.0$ | $n_2 = 1.6228$ |
| $r_4 = -23.4$ | $d_4 = 3.0$ | |
| $r_5 = 52.9$ | $d_5 = 4.0$ | $n_3 = 1.6228$ |
| $r_6 = \infty$ | $d_6 = 3.0$ | |
| $r_7 = \infty$ (field stop) | $d_7 = 72.0$ | |
| $r_8 = \infty$ | $d_8 = 3.0$ | $n_4 = 1.6228$ |
| $r_9 = -46.7$ | $d_9 = 5.0$ | |
| $r_{10} = \infty$ (aperture stop) | | |

($r_{11}$ through $r_{17}$, $d_{10}$ through $d_{16}$, $n_5$, $n_6$ and $n_7$ are to be added as numerical data of the relay lens systems described later)

| | | |
|---|---|---|
| $r_{18} = 15.14$ | $d_{17} = 3.6$ | |
| $r_{19} = -45.61$ | $d_{18} = 7.1$ | $n_8 = 1.5163$ |
| $r_{20} = 5.77$ | $d_{19} = 0.5$ | |
| $r_{21} = \infty$ | $d_{20} = 8.1$ | $n_9 = 1.5688$ |

In the numerical data shown as the above embodiment, $r_{18}$ through $r_{21}$, $d_{18}$ through $d_{20}$, $n_8$ and $n_9$ are those of the condenser lens.

Among the relay lens systems for high magnification levels to be arranged between the aperture stop and condenser lens, the one shown in FIG. 4A has the numerical data exemplified in Table 2 below:

TABLE 2

| | | |
|---|---|---|
| $r_{11} = 15.4$ | $d_{10} = 3.0$ | |
| | $d_{11} = 3.0$ | $n_5 = 1.6228$ |
| $r_{12} = \infty$ | $d_{12} = 20.0$ | |
| $r_{13} = 22.2$ | $d_{13} = 3.0$ | $n_6 = 1.6228$ |
| $r_{14} = -22.2$ | $d_{14} = 44.0$ | |
| $r_{15} = \infty$ | $d_{15} = 4.0$ | $n_7 = 1.6228$ |
| $r_{16} = -30.7$ | $d_{16} = 3.0$ | |
| $r_{17} = \infty$ (light source image 1'') | | |

The relay lens system shown in Table 2 consists of three positive lens components and is an afocal system.

Among the relay lens system for high magnification levels, the one shown in FIG. 4B has the numerical data exemplified in Table 3 below:

TABLE 3

| | | |
|---|---|---|
| $r_{11} = 23.0$ | $d_{10} = 3.0$ | |
| | $d_{11} = 2.5$ | $n_5 = 1.6228$ |
| $r_{12} = \infty$ | $d_{12} = 32.5$ | |
| $r_{13} = 24.9$ | $d_{13} = 4.0$ | $n_6 = 1.6228$ |
| $r_{14} = -24.9$ | $d_{14} = 32.5$ | |
| $r_{15} = \infty$ | $d_{15} = 2.5$ | $n_7 = 1.6228$ |
| $r_{16} = -23.0$ | $d_{16} = 3.0$ | |
| $r_{17} = \infty$ (light source image 1'') | | |

The relay lens system shown in Table 3 consists of three positive lens components and is an afocal system.

The numerical data for low magnification levels shown in FIG. 5A and FIG. 5B have the numerical data exemplified in Table 4 and Table 5 respectively below:

TABLE 4

| | | |
|---|---|---|
| $r_{11} = -49.8$ | $d_{10} = 3.0$ | |
| | $d_{11} = 1.5$ | $n_5 = 1.6228$ |
| $r_{12} = \infty$ | | |
| | $d_{12} = 31.5$ | |
| $r_{13} = \infty$ | | |
| | $d_{13} = 3.5$ | $n_6 = 1.6228$ |
| $r_{14} = -49.8$ | | |
| | $d_{14} = 0.5$ | |
| $r_{15} = 49.8$ | | |
| | $d_{15} = 3.5$ | $n_7 = 1.6228$ |
| $r_{16} = \infty$ | | |
| | $d_{16} = 56.5$ | |
| $r_{17} = \infty$ (object) | | |

The relay lens system shown in Table 4 consists of a negative lens component and a positive lens component.

TABLE 5

| | | |
|---|---|---|
| $r_{11} = 62.8$ | $d_{10} = 3.0$ | |
| | $d_{11} = 2.5$ | $n_5 = 1.6228$ |
| $r_{12} = \infty$ | | |
| | $d_{12} = 69.5$ | |
| $r_{13} = \infty$ | | |
| | $d_{13} = 5.0$ | $n_6 = 1.6228$ |
| $r_{14} = -49.8$ | | |
| | $d_{14} = 20.0$ | |
| $r_{15} = \infty$ (object) | | |

The relay lens system shown in Table 5 consists of two positive lens components.

In addition, other examples of relay lens systems in different combinations will be described below. The relay lens systems are illustrated in FIG. 6A, FIG. 6B, FIG. 6C, FIG. 7A, FIG. 7B, FIG. 7C, FIG. 8A, FIG. 8B, FIG. 8C, FIG. 9A, FIG. 9B and FIG. 9C and have the numerical data summarized in Table 6 through Table 10 below:

TABLE 6 (FIG. 6C)

| | | |
|---|---|---|
| $r_{11} = 30.7$ | $d_{10} = 3.0$ | |
| | $d_{11} = 4.0$ | $n_5 = 1.6228$ |
| $r_{12} = \infty$ | | |
| | $d_{12} = 44.0$ | |
| $r_{13} = 22.2$ | | |
| | $d_{13} = 3.0$ | $n_6 = 1.6228$ |
| $r_{14} = -22.2$ | | |
| | $d_{14} = 20.0$ | |
| $r_{15} = \infty$ | | |
| | $d_{15} = 3.0$ | $n_7 = 1.6228$ |
| $r_{16} = -15.4$ | | |
| | $d_{16} = 3.0$ | |
| $r_{17} = \infty$ (light source image 1″) | | |

The relay lens system shown in Table 6 consists of three positive lens components and is an afocal system.

TABLE 7 (FIG. 7C)

| | | |
|---|---|---|
| $r_{11} = 43.3$ | $d_{10} = 3.0$ | |
| | $d_{11} = 2.0$ | $n_5 = 1.6228$ |
| $r_{12} = \infty$ | | |
| | $d_{12} = 44.0$ | |
| $r_{13} = -46.5$ | | |
| | $d_{13} = 2.0$ | $n_6 = 1.6228$ |
| $r_{14} = 46.5$ | | |
| | $d_{14} = 44.0$ | |
| $r_{15} = \infty$ | | |

TABLE 7 (FIG. 7C)-continued

| | | |
|---|---|---|
| $r_{16} = -43.3$ | $d_{15} = 2.0$ | $n_7 = 1.6228$ |
| | $d_{16} = 3.0$ | |
| $r_{17} = \infty$ (object) | | |

The relay lens system shown in Table 7 consists of a positive lens component, a negative lens component and a positive lens component.

TABLE 8 (FIG. 8A)

| | | |
|---|---|---|
| $r_{11} = \infty$ | $d_{10} = 23.0$ | |
| | $d_{11} = 3.5$ | $n_5 = 1.6228$ |
| $r_{12} = -21.34$ | | |
| | $d_{12} = 0.5$ | |
| $r_{13} = 21.34$ | | |
| | $d_{13} = 3.5$ | $n_6 = 1.6228$ |
| $r_{14} = \infty$ | | |
| | $d_{14} = 44.0$ | |
| $r_{15} = \infty$ | | |
| | $d_{15} = 4.5$ | $n_7 = 1.6228$ |
| $r_{16} = -21.8$ | | |
| | $d_{16} = 1.0$ | |
| $r_{17} = \infty$ (light source image 1″) | | |

The relay lens system shown in Table 8 consists of two positive lens components and is an afocal system.

TABLE 9 (FIG. 8B)

| | | |
|---|---|---|
| $r_{11} = 11.8$ | $d_{10} = 1.0$ | |
| | $d_{11} = 3.5$ | $n_5 = 1.6228$ |
| $r_{12} = \infty$ | | |
| | $d_{12} = 32.0$ | |
| $r_{13} = \infty$ | | |
| | $d_{13} = 3.5$ | $n_6 = 1.6228$ |
| $r_{14} = -24.0$ | | |
| | $d_{14} = 0.5$ | |
| $r_{15} = 24.0$ | | |
| | $d_{15} = 3.5$ | $n_7 = 1.6228$ |
| $r_{16} = \infty$ | | |
| | $d_{16} = 36.0$ | |
| $r_{17} = \infty$ (light source image 1″) | | |

The relay lens system shown in Table 8 consists of two positive lens components and is an afocal system.

TABLE 10 (FIG. 8C)

| | | |
|---|---|---|
| $r_{11} = 21.8$ | $d_{10} = 1.0$ | |
| | $d_{11} = 3.0$ | $n_5 = 1.6228$ |
| $r_{12} = \infty$ | | |
| | $d_{12} = 45.0$ | |
| $r_{13} = \infty$ | | |
| | $d_{13} = 3.5$ | $n_6 = 1.6228$ |
| $r_{14} = -21.34$ | | |
| | $d_{14} = 0.5$ | |
| $r_{15} = 21.34$ | | |
| | $d_{15} = 3.5$ | $n_7 = 1.6228$ |
| $r_{16} = \infty$ | | |
| | $d_{16} = 23.5$ | |
| $r_{17} = \infty$ (light source image 1″) | | |

The relay lens system shown in Table 8 consists of two positive lens components and is an afocal system.

Figure 6A:
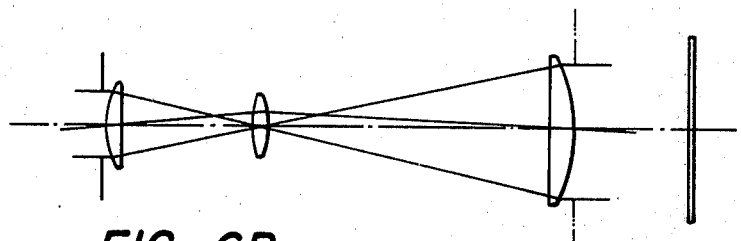
FIG. 6A, FIG. 6B and FIG. 6C show sectional views illustrating composition of other relay lens systems for high magnification levels to be used in the embodiment of the present invention.
Figure 6B:
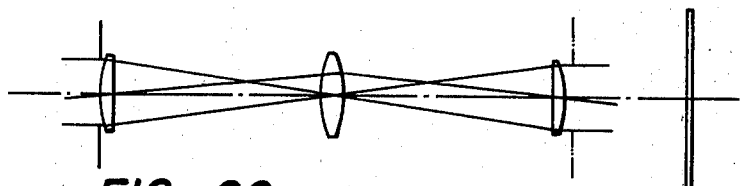
Figure 6C:
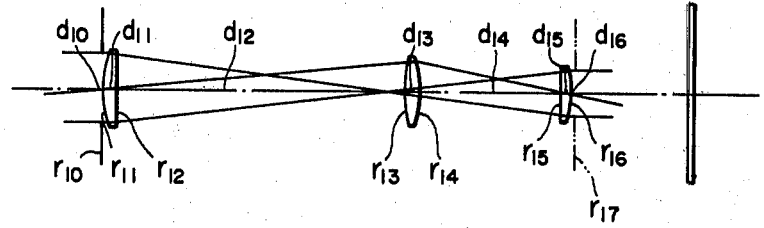
Figure 7A:
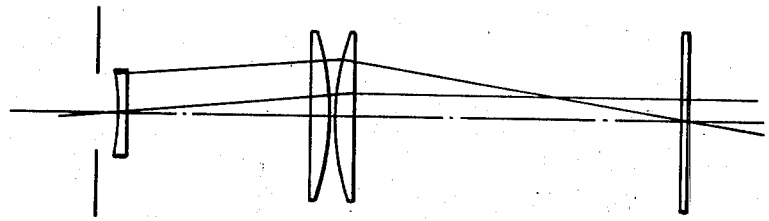
FIG. 7A, FIG. 7B and FIG. 7C show sectional views illustrating composition of other relay lens systems for low magnification levels to be used in the embodiment of the present invention.
Figure 7B:
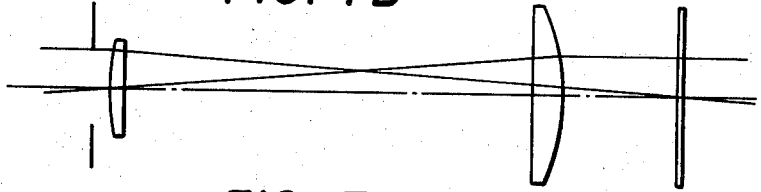
Figure 7C:
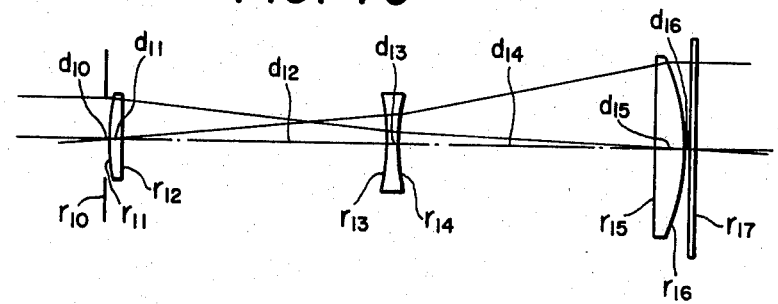
Figure 8A:
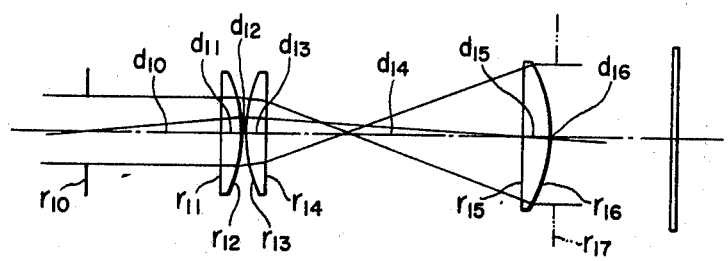
FIG. 8A, FIG. 8B and FIG. 8C shows sectional views illustrating composition of third relay lens systems for high magnification levels to be used in the embodiment of the present invention.
Figure 8B:
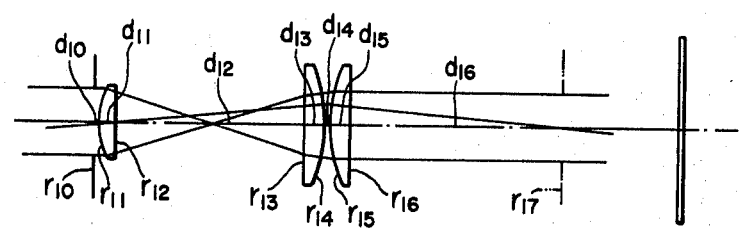
Figure 8C:
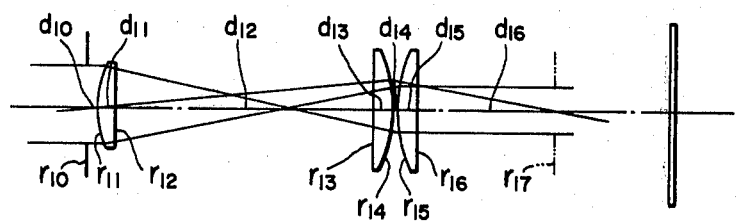
Figure 9A:
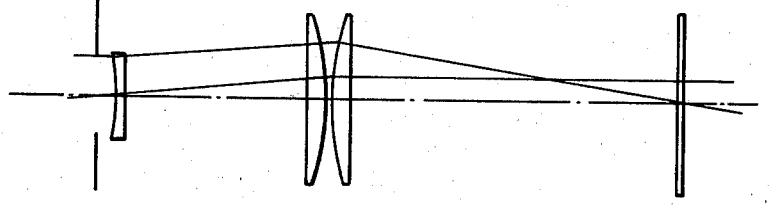
FIG. 9A, FIG. 9B and FIG. 9C show sectional views illustrating composition of third relay lens systems for low magnification levels to be used in the embodiment of the present invention.
Figure 9B:
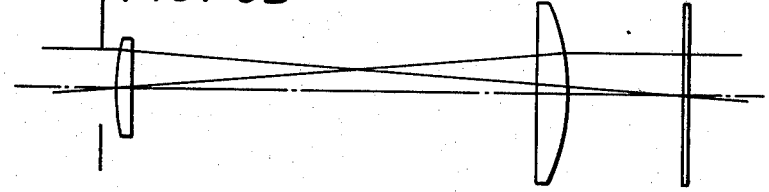
Figure 9C:
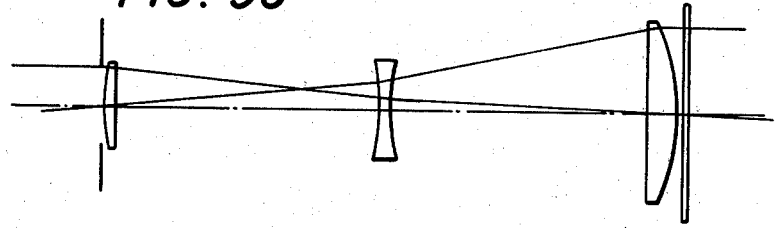

Out of the examples of the relay lens systems described above, those shown in FIG. 6A through FIG. 6C are used in combination with the ones illustrated in FIG. 7A through FIG. 7C, the former being for microscopy at the high magnification levels, whereas the latter for microscopy at the low magnification levels. FIG. 6A shows a relay lens system which is to be used at magnification levels of 100× to 40×, the one shown in FIG. 6B at a magnification level of 20× and the one shown in FIG. 6C is at a magnification level of 10×. The relay lens systems shown in FIG. 6A and FIG. 6B respectively are the same as those illustrated in FIG. 4A and FIG. 4B respectively and have the numerical data summarized in Table 2 and Table 3 respectively. The relay lens systems shown in FIG. 7A through FIG. 7C are to be used for microscopy at the low magnification levels: the one shown in FIG. 7A at a magnification level of 4×, the one shown in FIG. 7B at a magnification level of 2× and the one shown in FIG. 7C at a magnification level of 1×. Out of these relay lens systems, the ones shown in FIG. 7A and FIG. 7B are the same as those illustrated in FIG. 5A and FIG. 5B respectively. FIG. 8A through FIG. 8C and FIG. 9A through FIG. 9C show relay lens systems to be used as a combination: FIG. 8A showing a relay lens system for microscopy at a magnification levels of 100× to 40×, FIG. 8B showing one at a magnification level of 20×, FIG. 8C at a magnification level of 10×, FIG. 9A at a magnification level of 4×, FIG. 9B at a magnification level of 2× and FIG. 9C at a magnification level of 1×. Out of these relay lens systems, those shown in FIG. 9A, FIG. 9B and FIG. 9C are the same as the ones illustrated in FIG. 7A, FIG. 7B and FIG. 7C respectively.

As is understood from the foregoing descriptions, the illumination system for microscopes according to the present invention is so designed as to permit fovarable illumination over a wide magnification range from 100× to 1× and has a composition in which the relay lens systems to be switched are not arranged on the side of the light source, thereby making it possible to simplify construction of the switching mechanism to be combined with said illumination system. Further, the illumination system for microscopes according to the present invention can assure more favorable illumination when it is so adapted as to switch multiple relay lens systems in accordance with desired magnification levels as described as the preferred embodiment of the present invention.

I claim:

1. An illumination system for microscopes comprising a light source, a collector lens, an aperture stop arranged in the vicinity of an image of said light source formed by said collector lens, a field stop arranged on the object side of said collector lens between said light source and aperture stop, condenser lens, and relay lens system for high magnification level to be arranged between said aperture stop and said condenser lens so as to form an image of said light source image in the vicinity of the front focal point of said condenser lens for illumination for microscopy at the high magnification level, said illumination system being so adapted as to remove said relay lens system for high magnification level and said condenser lens out of the optical path and arrange a relay lens system for low magnification level so as to locate the front focal point thereof in the vicinity of said light source image for microscopy at a low magnification level, an image of said field stop being formed on an object to be observed by said condenser lens and relay lens system for high magnification level, and said image of said field stop being formed on the object to be observed by said relay lens for low magnification level at the low magnification level.

2. An illumination system for microscopes according to claim 1 wherein said relay lens system for high magnification level is prepared at least in two types exchangeable with each other and said relay lens system for low magnification level is prepared at least in two types exchangeable with each other.

3. An illumination system for microscopes according to claim 2 additionally comprising a field lens arranged in the vicinity of the light source side of said aperture stop and having its front focal point located so as to be nearly coincident with the position of said field stop.

4. An illumination system for microscopes according to claim 3 wherein each of a first and second of said two relay lens systems for high magnification levels consists of three positive lens components, a first of said two relay lens systems for low magnification levels consists of a negative lens component and a positive lens component, and a second of said two relay lens systems for low magnification levels consists of two positive lens components.

5. An illumination system for microscopes according to claim 4 wherein said collector lens consists of three positive lens elements, said field lens consists of a positive lens element, said condenser lens consists of two positive lens elements, said relay lens system for high magnification levels consist of single-element lens components only, said first relay lens system for low magnification level consists of the negative component composed of a single element and the positive lens component composed of two positive elements and said second relay lens system for low magnification level consists of single-element lens components only, and said illumination system having the following numerical data:

(collector lens)

| | | |
|---|---|---|
| $r_1 = \infty$ | $d_0 = 13.9$ | |
| | $d_1 = 5.0$ | $n_1 = 1.6228$ |
| $r_2 = -23.4$ | | |
| | $d_2 = 0.5$ | |
| $r_3 = \infty$ | | |
| | $d_3 = 7.0$ | $n_2 = 1.6228$ |
| $r_4 = -23.4$ | | |
| | $d_4 = 3.0$ | |
| $r_5 = 52.9$ | | |
| | $d_5 = 4.0$ | $n_3 = 1.6228$ |
| $r_6 = \infty$ | | |
| | $d_6 = 3.0$ | |
| $r_7 = \infty$ (field stop) | | |
| | $d_7 = 72.0$ | |
| (field lens) | | |
| $r_8 = \infty$ | | |
| | $d_8 = 3.0$ | $n_4 = 1.6228$ |
| $r_9 = -46.7$ | | |
| | $d_9 = 5.0$ | |
| $r_{10} = \infty$ (aperture stop) | | |
| (first relay lens system for high magnification level) | | |
| | $d_{10} = 3.0$ | |
| $r_{11} = 15.4$ | | |
| | $d_{11} = 3.0$ | $n_5 = 1.6228$ |
| $r_{12} = \infty$ | | |
| | $d_{12} = 20.0$ | |
| $r_{13} = 22.2$ | | |
| | $d_{13} = 3.0$ | $n_6 = 1.6228$ |
| $r_{14} = -22.2$ | | |
| | $d_{14} = 44.0$ | |
| $r_{15} = \infty$ | | |
| | $d_{15} = 4.0$ | $n_7 = 1.6228$ |
| $r_{16} = -30.7$ | | |
| | $d_{16} = 3.0$ | |
| $r_{17} = \infty$ (light source image 1″) | | |
| (condenser lens) | | |
| | $d_{17} = 3.6$ | |
| $r_{18} = 15.14$ | | |
| | $d_{18} = 7.1$ | $n_8 = 1.5163$ |
| $r_{19} = -45.61$ | | |
| | $d_{19} = 0.5$ | |
| $r_{20} = 5.77$ | | |
| | $d_{20} = 8.1$ | $n_9 = 1.5688$ |

-continued $r_{21} = \infty$
(second relay lens system for high magnification level)

| | $d_{10} = 3.0$ | |
|---|---|---|
| $r_{11} = 23.0$ | | |
| | $d_{11} = 2.5$ | $n_5 = 1.6228$ |
| $r_{12} = \infty$ | | |
| | $d_{12} = 32.5$ | |
| $r_{13} = 24.9$ | | |
| | $d_{13} = 4.0$ | $n_6 = 1.6228$ |
| $r_{14} = -24.9$ | | |
| | $d_{14} = 32.5$ | |
| $r_{15} = \infty$ | | |
| | $d_{15} = 2.5$ | $n_7 = 1.6228$ |
| $r_{16} = -23.0$ | | |
| | $d_{16} = 3.0$ | |
| $r_{17} = \infty$ (light source image 1″) | | |

(first relay lens system for low magnification level)

| | $d_{10} = 3.0$ | |
|---|---|---|
| $r_{11} = -49.8$ | | |
| | $d_{11} = 1.5$ | $n_5 = 1.6228$ |
| $r_{12} = \infty$ | | |
| | $d_{12} = 31.5$ | |
| $r_{13} = \infty$ | | |
| | $d_{13} = 3.5$ | $n_6 = 1.6228$ |
| $r_{14} = -49.8$ | | |
| | $d_{14} = 0.5$ | |
| $r_{15} = 49.8$ | | |
| | $d_{15} = 3.5$ | $n_7 = 1.6228$ |
| $r_{16} = \infty$ | | |
| | $d_{16} = 56.5$ | |
| $r_{17} = \infty$ (object) | | |

(second relay lens system for low magnification level)

| | $d_{10} = 3.0$ | |
|---|---|---|
| $r_{11} = 62.8$ | | | wherein reference symbols $r_1, r_2, \ldots$ represent radii of curvature of the surfaces of the respective lenses, reference symbols $d_0, d_1, d_2, \ldots$ represent thicknesses of the respective lenses and airspaces, reference symbols $n_1, n_2, \ldots$ represent refractive indices of the respective lenses.

6. An illumination system for microscopes according to claim 2 wherein each of a first and second of said two relay lens systems for high magnification levels consists of three positive lens components, a first of said two relay lens systems for low magnification levels consists of a negative lens component and a positive lens component, and a second of said two relay lens systems for low magnification levels consists of two positive lens components.

7. An illumination system for microscopes according to claim 1 additionally comprising a field lens arranged in the vicinity of the light source side of said aperture stop and having its front focal point located so as to be nearly coincident with the position of said field stop.

8. An illumination system for microscopes according to claim 1 wherein said relay lens system for high magnification level is prepared in three types exchangeable with each other and said relay lens system for low magnification level is prepared in three types exchangeable with each other, each of a first, second and third of said three relay lens systems for high magnification levels consists of three positive lens components, a first of said three relay lens systems for low magnification levels consists of a negative lens component and a positive lens component, a second of said three relay lens systems for low magnification levels consists of two positive lens components and a third of said three relay lens systems for low magnification levels consists of a positive lens component, a negative lens component and a positive lens component.

9. An illumination system for microscopes according to claim 1 wherein said illumination system for microscopes additionally comprises a field lens arranged in the vicinity of the light source side of said aperture stop and having its front focal point located so as to be nearly coincident with the position of said field stop and said relay lens system for high magnification level is prepared in three types exchangeable with each other and said relay lens system for low magnification level is prepared in three types exchangeable with each other, each of a first, second and third of said three relay lens systems for high magnification levels consists of three positive lens components, a first of said three relay lens systems for low magnification levels consists of a negative lens component and a positive lens component, a second of said three relay lens systems for low magnification levels consists of two positive lens components and third of said three relay lens components for low magnification levels consists of a positive lens component, a negative lens component and a positive lens component.

10. An illumination system for microscopes according to claim 9 wherein said collector lens consists of three positive lens elements, said field lens consists of a positive lens element, said condenser lens consists of two positive lens elements, said relay lens systems for high magnification levels consist of single-element lens components only, said first relay lens system for low magnification level consists of the negative lens component composed of a single element and the positive lens component composed of two positive elements, said second relay lens system for low magnification level consists of single-element lens components only, said third relay lens system for low magnification level consists of single-element lens components only, and said illumination system having the following numerical data:

(collector lens)

| | $d_0 = 13.9$ | |
|---|---|---|
| $r_1 = \infty$ | | |
| | $d_1 = 5.0$ | $n_1 = 1.6228$ |
| $r_2 = -23.4$ | | |
| | $d_2 = 0.5$ | |
| $r_3 = \infty$ | | |
| | $d_3 = 7.0$ | $n_2 = 1.6228$ |
| $r_4 = -23.4$ | | |
| | $d_4 = 3.0$ | |
| $r_5 = 52.9$ | | |
| | $d_5 = 4.0$ | $n_3 = 1.6228$ |
| $r_6 = \infty$ | | |
| | $d_6 = 3.0$ | |
| $r_7 = \infty$ (field stop) | | |
| | $d_7 = 72.0$ | |

(field lens)

| | | |
|---|---|---|
| $r_8 = \infty$ | | |
| | $d_8 = 3.0$ | $n_4 = 1.6228$ |
| $r_9 = -46.7$ | | |
| | $d_9 = 5.0$ | |
| $r_{10} = \infty$ (aperture stop) | | |

(first relay lens system for high magnification level)

| | $d_{10} = 3.0$ | |
|---|---|---|
| $r_{11} = 15.4$ | | |
| | $d_{11} = 3.0$ | $n_5 = 1.6228$ |
| $r_{12} = \infty$ | | |
| | $d_{12} = 20.0$ | |
| $r_{13} = 22.2$ | | |
| | $d_{13} = 3.0$ | $n_6 = 1.6228$ |
| $r_{14} = -22.2$ | | |
| | $d_{14} = 44.0$ | |
| $r_{15} = \infty$ | | |
| | $d_{15} = 4.0$ | $n_7 = 1.6228$ |
| $r_{16} = -30.7$ | | |
| | $d_{16} = 3.0$ | |
| $r_{17} = \infty 0$ (light source image 1″) | | |

(condenser lens)

-continued

| | |
|---|---|
| $r_{18} = 15.14$ | |
| | $d_{17} = 3.6$ |
| $r_{19} = -45.61$ | $d_{18} = 7.1 \quad n_8 = 1.5163$ |
| | $d_{19} = 0.5$ |
| $r_{20} = 5.77$ | |
| | $d_{20} = 8.1 \quad n_9 = 1.5688$ |
| $r_{21} = \infty$ | |

(second relay lens system for high magnification level)

| | |
|---|---|
| | $d_{10} = 3.0$ |
| $r_{11} = 23.0$ | |
| | $d_{11} = 2.5 \quad n_5 = 1.6228$ |
| $r_{12} = \infty$ | |
| | $d_{12} = 32.5$ |
| $r_{13} = 24.9$ | |
| | $d_{13} = 4.0 \quad n_6 = 1.6228$ |
| $r_{14} = -24.9$ | |
| | $d_{14} = 32.5$ |
| $r_{15} = \infty$ | |
| | $d_{15} = 2.5 \quad n_7 = 1.6228$ |
| $r_{16} = -23.0$ | |
| | $d_{16} = 3.0$ |
| $r_{17} = \infty$ (light source image 1″) | |

(third relay lens system for high magnification level)

| | |
|---|---|
| | $d_{10} = 3.0$ |
| $r_{11} = 30.7$ | |
| | $d_{11} = 4.0 \quad n_5 = 1.6228$ |
| $r_{12} = \infty$ | |
| | $d_{12} = 44.0$ |
| $r_{13} = 22.2$ | |
| | $d_{13} = 3.0 \quad n_6 = 1.6228$ |
| $r_{14} = -22.2$ | |
| | $d_{14} = 20.0$ |
| $r_{15} = \infty$ | |
| | $d_{15} = 3.0 \quad n_7 = 1.6228$ |
| $r_{16} = -15.4$ | |
| | $d_{16} = 3.0$ |
| $r_{17} = \infty$ (light source image 1″) | |

(first relay lens system for low magnification level)

| | |
|---|---|
| | $d_{10} = 3.0$ |
| $r_{11} = -49.8$ | |
| | $d_{11} = 1.5 \quad n_5 = 1.6228$ |
| $r_{12} = \infty$ | |
| | $d_{12} = 31.5$ |
| $r_{13} = \infty$ | |
| | $d_{13} = 3.5 \quad n_6 = 1.6228$ |
| $r_{14} = -49.8$ | |
| | $d_{14} = 0.5$ |
| $r_{15} = 49.8$ | |
| | $d_{15} = 3.5 \quad n_7 = 1.6228$ |
| $r_{16} = \infty$ | |
| | $d_{16} = 56.5$ |
| $r_{17} = \infty$ (object) | |

(second relay lens system for low magnification level)

| | |
|---|---|
| | $d_{10} = 3.0$ |
| $r_{11} = 62.8$ | |
| | $d_{11} = 2.5 \quad n_5 = 1.6228$ |
| $r_{12} = \infty$ | |
| | $d_{12} = 69.5$ |
| $r_{13} = \infty$ | |
| | $d_{13} = 5.0 \quad n_6 = 1.6228$ |
| $r_{14} = -49.8$ | |
| | $d_{14} = 20.0$ |
| $r_{15} = \infty$ (object) | |

(third relay lens system for low magnification level)

| | |
|---|---|
| | $d_{10} = 3.0$ |
| $r_{11} = 43.3$ | |
| | $d_{11} = 2.0 \quad n_5 = 1.6228$ |
| $r_{12} = \infty$ | |
| | $d_{12} = 44.0$ |
| $r_{13} = -46.5$ | |
| | $d_{13} = 2.0 \quad n_6 = 1.6228$ |
| $r_{14} = 46.5$ | |
| | $d_{14} = 44.0$ |
| $r_{15} = \infty$ | |
| | $d_{15} = 2.0 \quad n_7 = 1.6228$ |
| $r_{16} = -43.3$ | |
| | $d_{16} = 3.0$ |
| $r_{17} = \infty$ (object) | | wherein reference symbols $r_1, r_2, \ldots$ represent radii of curvature of the surfaces of the respective lenses, reference symbols $d_0, d_1, d_2, \ldots$ represent thicknesses of the respective lenses and airspaces, reference symbols $n_1, n_2, \ldots$ represent refractive indices of the respective lenses.

11. An illumination system for microscopes according to claim 1 wherein said relay lens system for high magnification level is prepared in two types exchangeable with each other and said relay lens system for low magnification level is prepared in three types exchangeable with each other, each of a first and second of said two relay lens systems for high magnification levels consists of two positive lens components, a first of said three relay lens systems for low magnification levels consists of a negative lens component and a positive lens component, a second of said three relay lens systems for low magnification levels consists of two positive lens components and a third of said three relay lens systems for low magnification levels consists of a positive lens component, a negative lens component and a positive lens component.

12. An illumination system for microscopes according to claim 1 wherein said illumination system for microscopes additionally comprises a field lens arranged in the vicinity of the light source side of said aperture stop and having its front focal point located so as to be nearly coincident with the position of said field stop and said relay lens system for high magnification level is prepared in two types exchangeable with each other and said relay lens system for low magnification level is prepared in three exchangeable with each other, each of a first and second of said two relay lens systems for high magnification levels consists of two positive lens components, a first of said three relay lens systems for low magnification levels consists of a negative lens component and a positive lens component, a second of said three relay lens systems for low magnification levels consists of two positive lens components and a third of said three relay lens systems for low magnification levels consists of a positive lens component, a negative lens component and a positive lens component.

13. An illumination system for microscopes according to claim 12 wherein said collector lens consists of three positive lens elements, said field lens consists of a positive lens element, said condenser lens consists of two positive lens elements, said first relay lens system for high magnification level consists of the positive lens component composed of two positive elements and the positive lens component composed of a single element, said second relay lens system for high magnification level consists of the positive lens component composed of a single element and the positive lens component composed of two positive elements, said third relay lens system for high magnification level consists of the positive lens component composed of a single element and the positive lens component composed of two positive elements, said first relay lens system for low magnification level consists of the negative lens component composed of a single element and the positive lens component composed of two positive elements, said second relay lens system for low magnification level consists of single-element lens components only, said third relay lens system for low magnification level consists of single-element lens components only, and said illumination system having the following numerical data:

(collector lens)

$d_0 = 13.9$

-continued

| | | |
|---|---|---|
| $r_1 = \infty$ | | |
| | $d_1 = 5.0$ | $n_1 = 1.6228$ |
| $r_2 = -23.4$ | | |
| | $d_2 = 0.5$ | |
| $r_3 = \infty$ | | |
| | $d_3 = 7.0$ | $n_2 = 1.6228$ |
| $r_4 = -23.4$ | | |
| | $d_4 = 3.0$ | |
| $r_5 = 52.9$ | | |
| | $d_5 = 4.0$ | $n_3 = 1.6228$ |
| $r_6 = \infty$ | | |
| | $d_6 = 3.0$ | |
| $r_7 = \infty$ (field stop) | | |
| | $d_7 = 72.0$ | |
| (field lens) | | |
| $r_8 = \infty$ | | |
| | $d_8 = 3.0$ | $n_4 = 1.6228$ |
| $r_9 = -46.7$ | | |
| | $d_9 = 5.0$ | |
| $r_{10} = \infty$ (aperture stop) | | |

(first relay lens system for high magnification level)

| | $d_{10} = 23.0$ | |
|---|---|---|
| $r_{11} = \infty$ | | |
| | $d_{11} = 3.5$ | $n_5 = 1.6228$ |
| $r_{12} = -21.34$ | | |
| | $d_{12} = 0.5$ | |
| $r_{13} = 21.34$ | | |
| | $d_{13} = 3.5$ | $n_6 = 1.6228$ |
| $r_{14} = \infty$ | | |
| | $d_{14} = 44.0$ | |
| $r_{15} = \infty$ | | |
| | $d_{15} = 4.5$ | $n_7 = 1.6228$ |
| $r_{16} = -21.8$ | | |
| | $d_{16} = 1.0$ | |
| $r_{17} = \infty$ (light source image 1″) | | |

(condenser lens)

| | $d_{17} = 3.6$ | |
|---|---|---|
| $r_{18} = 15.14$ | | |
| | $d_{18} = 7.1$ | $n_8 = 1.5163$ |
| $r_{19} = -45.61$ | | |
| | $d_{19} = 0.5$ | |
| $r_{20} = 5.77$ | | |
| | $d_{20} = 8.1$ | $n_9 = 1.5688$ |
| $r_{21} = \infty$ | | |

(second relay lens system for high magnification level)

| | $d_{10} = 1.0$ | |
|---|---|---|
| $r_{11} = 11.8$ | | |
| | $d_{11} = 3.5$ | $n_5 = 1.6228$ |
| $r_{12} = \infty$ | | |
| | $d_{12} = 32.0$ | |
| $r_{13} = \infty$ | | |
| | $d_{13} = 3.5$ | $n_6 = 1.6228$ |
| $r_{14} = -24.0$ | | |
| | $d_{14} = 0.5$ | |
| $r_{15} = 24.0$ | | |
| | $d_{15} = 3.5$ | $n_7 = 1.6228$ |
| $r_{16} = \infty$ | | |
| | $d_{16} = 36.0$ | |
| $r_{17} = \infty$ (light source image 1″) | | |

(third relay lens system for high magnification level)

| | $d_{10} = 1.0$ | |
|---|---|---|
| $r_{11} = 21.8$ | | |
| | $d_{11} = 3.0$ | $n_5 = 1.6228$ |
| $r_{12} = \infty$ | | |
| | $d_{12} = 45.0$ | |
| $r_{13} = \infty$ | | |
| | $d_{13} = 3.5$ | $n_6 = 1.6228$ |
| $r_{14} = -21.34$ | | |
| | $d_{14} = 0.5$ | |
| $r_{15} = 21.34$ | | |
| | $d_{15} = 3.5$ | $n_7 = 1.6228$ |
| $r_{16} = \infty$ | | |
| | $d_{16} = 23.5$ | |
| $r_{17} = \infty$ (light source image 1″) | | |

(first relay lens system for low magnification level)

| | $d_{10} = 3.0$ | |
|---|---|---|
| $r_{11} = -49.8$ | | |
| | $d_{11} = 1.5$ | $n_5 = 1.6228$ |
| $r_{12} = \infty$ | | |
| | $d_{12} = 31.5$ | |
| $r_{13} = \infty$ | | |
| | $d_{13} = 3.5$ | $n_6 = 1.6228$ |
| $r_{14} = -49.8$ | | |
| | $d_{14} = 0.5$ | |
| $r_{15} = 49.8$ | | |
| | $d_{15} = 3.5$ | $n_7 = 1.6228$ |
| $r_{16} = \infty$ | | |
| | $d_{16} = 56.5$ | |
| $r_{17} = \infty$ (object) | | |

(second relay lens system for low magnification level)

| | $d_{10} = 3.0$ | |
|---|---|---|
| $r_{11} = 62.8$ | | |
| | $d_{11} = 2.5$ | $n_5 = 1.6228$ |
| $r_{12} = \infty$ | | |
| | $d_{12} = 69.5$ | |
| $r_{13} = \infty$ | | |
| | $d_{13} = 5.0$ | $n_6 = 1.6228$ |
| $r_{14} = -49.8$ | | |
| | $d_{14} = 20.0$ | |
| $r_{15} = \infty$ (object) | | |

(third relay lens system for low magnification level)

| | $d_{10} = 3.0$ | |
|---|---|---|
| $r_{11} = 43.3$ | | |
| | $d_{11} = 2.0$ | $n_5 = 1.6228$ |
| $r_{12} = \infty$ | | |
| | $d_{12} = 44.0$ | |
| $r_{13} = -46.5$ | | |
| | $d_{13} = 2.0$ | $n_6 = 1.6228$ |
| $r_{14} = 46.5$ | | |
| | $d_{14} = 44.0$ | |
| $r_{15} = \infty$ | | |
| | $d_{15} = 2.0$ | $n_7 = 1.6228$ |
| $r_{16} = -43.3$ | | |
| | $d_{16} = 3.0$ | |
| $r_{17} = \infty$ (object) | | | wherein reference symbols $r_1, r_2, \ldots$ represent radii of curvature of the surfaces of the respective lenses, reference symbols $d_0, d_1, d_2, \ldots$ represent thicknesses of the respective lenses and airspaces, reference symbols $n_1, n_2, \ldots$ represent refractive indices of the respective lenses.

* * * * *